United States Patent
Knapp et al.

[11] Patent Number: 5,970,842
[45] Date of Patent: Oct. 26, 1999

[54] HANGER ASSEMBLY FOR MISSILES

[75] Inventors: Klaus-Dieter Knapp; Peter Gerd Fisch; Dirk Bross, all of Überlingen, Germany

[73] Assignee: Bodenseewerk Geratetechnik GmbH, Uberlingen, Germany

[21] Appl. No.: 09/058,216

[22] Filed: Apr. 10, 1998

[30] Foreign Application Priority Data

Apr. 17, 1997 [DE] Germany .............. 197 15 972

[51] Int. Cl.⁶ ..................... F41F 3/06
[52] U.S. Cl. ............ 89/1.54; 89/1.53; 89/1.819
[58] Field of Search ............ 89/1.54, 1.58, 89/1.59, 1.805, 1.819, 1.53

[56] References Cited

U.S. PATENT DOCUMENTS

| | | | |
|---|---|---|---|
| 3,132,590 | 5/1964 | Hall | 89/1.819 |
| 4,392,411 | 7/1983 | Minkler | 89/1.819 |
| 5,094,140 | 3/1992 | Williams | 89/1.819 |

FOREIGN PATENT DOCUMENTS 865703  5/1941  France ................ 89/1.58

Primary Examiner—Stephen M. Johnson
Attorney, Agent, or Firm—McDermott, Will & Emery

[57] ABSTRACT

A hanger assembly for missiles, in which a hanger, with opposite carrying rails to guide the missile in a launcher, is connected to the missile by means of a screwed connection. The hanger is screwed from the outside, with screws to a enlargement or increased thickness portion (16,60). Preferably a clamp, provided with a enlargement or increased thickness portion surrounds the airframe (Zelle) of the missile and is fixed thereto. The screw connection of the hanger is effected with screws the axes of which form an angle with the plane of the carrying rails.

5 Claims, 3 Drawing Sheets

HANGER ASSEMBLY FOR MISSILES

FIELD OF THE INVENTION

The invention relates to a hanger assembly for missiles, in which a hanger, with opposite carrying rails to guide the missile in a launcher, is connected to the missile, by means of a screw connection.

BACKGROUND ART

Missiles which are fired from the air are suspended from launchers which are provided on the wings of an aircraft. To this end, the missiles are provided with "hangers", which are locked in the retaining mechanisms of the launcher. These hangers are parts having a substantially T-shaped cross-section. The "cross beams" of the "T" form two carrying rails, which lie on the inward extending guiding ledges of the launcher. Conventionally, a missile is provided with three such hangers. On loading the missile in the launcher, the hangers are pushed upwards through recesses in the guiding ledges. The missile is then pushed in longitudinally and is locked into the retaining mechanism of the launcher. To fire the missile, the retaining mechanism is released and the rocket motor is ignited. The missile is then pushed forward and out of the launcher by the thrust of the rocket motor, whereby the hangers slide over the guiding ledges. Therefore, the further back along the missile the hanger is located, the longer the carrying rails of the hanger must be, in order to allow the carrying rails to safely slide over the recesses of the guiding ledges allocated to the hangers further in front.

In a prior art missile, three such hangers are provided. The foremost hanger is mounted directly on the tubular airframe of the missile, in the region of a spar. This is done using screws, which are screwed from outside, radially to the outer cylindrical surface of the missile. A further hanger is fixed to a clamp or "belly band", which is laid around the airframe of the missile. The clamp is located on the airframe of the missile in the region of the rocket motor, where it is not possible to screw the hanger directly onto the airframe. A hanger is fixed to the clamp with screws which are guided through the clamp and the hanger from inside. A third hanger forms an integral part of the clamp.

The hangers are subjected to heavy wear. With time, this negatively affects their performance. However, with the prior art constructions, it is not possible to exchange the clamp-mounted hangers. The clamp must be removed, in order to loosen the screws, which are screwed in from the inside through the clamp and into the hangers. That is, however, not permissible. The clamp with an integrated hanger, must also be removed and exchanged in a non-permissible way, in order to exchange the hangers. It can also be that due to the retrofitting of existing missiles, the hanger must be mounted on a different position along the missile, where for example, there is no existing spar and therefore, it is not possible to screw the hanger on directly.

SUMMARY OF THE INVENTION

There are standardised tolerances for the dimensions and the radial positions of the hangers, to ensure that missiles can be suspended in different but standardised launchers.

It is an object of the invention to design a hanger assembly of the type mentioned in the beginning, such that, it is possible to exchanged a hanger mounted at any position along the missile.

According to the invention this object is achieved in that a enlargement or increased thickness portion is provided on the side of the missile and the hanger is screwed to the enlargement or increased thickness portion by screwing from the outside.

The fixing of the hanger to the missile is effected by either a clamp or "bellyband", or a enlargement or increased thickness portion on the structure of the missile itself. The hanger, therefore, does not need to be mounted in the region of a spar. On the contrary, the clamp or bellyband can be placed on any desirable position along the missile. In contrast to the above mentioned hanger assembly with a clamp, whereby the screws extent through the clamp and into the hanger from inside, in which sufficiently long threaded bores can be provided, the screwing, according to the invention, is carried out from the outside. Threaded bores, into which the screws engage, are provided on the enlargement or increased thickness portion of the clamp or bellyband, or of the tubular airframe of the missile. Therefore, a worn hanger can be removed and replaced by a new one, without having to remove the clamp or belly-band. The hanger is practically made in two parts, whereby the "upper part" comprises the carrying rails and, therefore, the worn parts, and the "lower part" comprises the enlargement or increased thickness portion on a clamp or on the tubular airframe of the missile.

Modifications of the invention are the subject matter of the dependent claims.

BRIEF DESCRIPTION OF THE DRAWINGS

Embodiments of the invention are described in greater detail hereinafter, with reference to the accompanying drawings.

DESCRIPTION OF THE INVENTION

Figure 1:
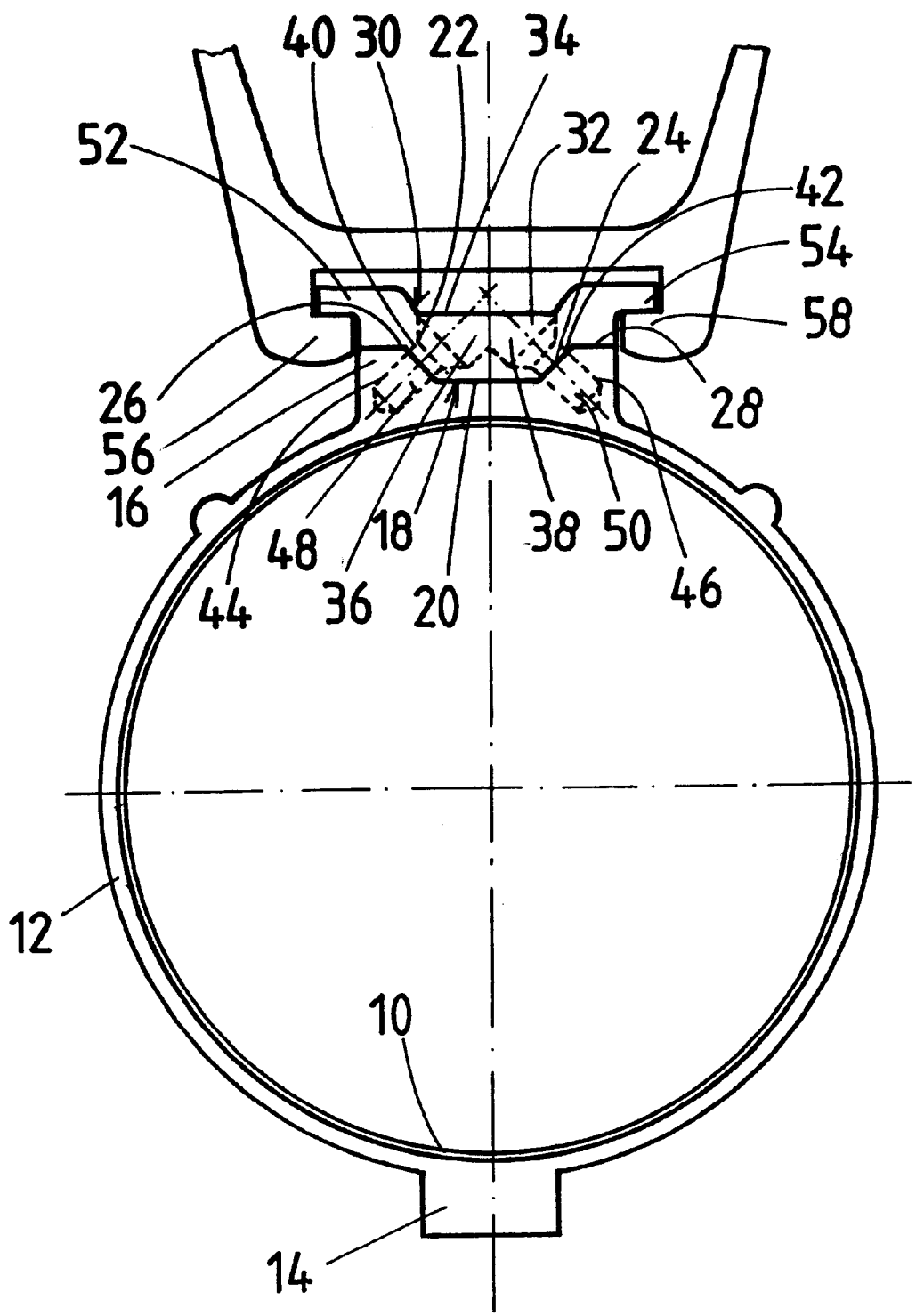
FIG. 1 shows a hanger assembly, in which the hanger is mounted on a clamp or a "belly band".

Referring to FIG. 1 a clamp 12 is laid around a substantially tubular airframe of a missile 10 and is tightened around the missile by means of a tightening device 14. The clamp 12 has a block like enlargement or increased thickness portion 16. The enlargement or increased thickness portion 16 forms a channel 18 on its outer side in the longitudinal direction having a trapezoidal cross-section with a tangential bottom 20 and inclined surfaces 22 and 24 running at an angel of 45° to the bottom 20. These inclined surfaces 22 and 24 join the tangential edge surfaces 26 and 28 as can be seen from FIG. 1. A hanger 30 is guided in the channel 18. The hanger 30 has a middle portion 32 and has inner surfaces complementary with the channel 18 and margin surfaces 26 and 28, with which the hanger 30 is guided on the enlargement or increased thickness portion. The tangential outer surface 34 is provided with recesses 36 and 38 inclining outwards. Bores 40 and 42 are provided in the recesses which are aligned with the threaded bores 44 and 46 respectively, in the enlargement or increased thickness portion 16. The hanger 30 is screwed to the enlargement or increased thickness portion 16 with screws 48 and 50. The axes of the screws 48 and 50 extend at an angle of 45° outwards from the outer surface 34, perpendicular to the inclined surfaces 22 and 24 of the canal 18 and the complementary inner surface of the hanger 30. The heads of the screws 48 and 50 are accommodated in the recesses 36 and 38. The hanger 30 forms two opposite carrying rails 52 and 54 on both sides of the middle portion 32. The carrying rails 52 and 54 and the middle portion 32 are one integral piece, the rails projecting laterally outwards over the enlargement or increased thickness portion 16 and the middle portion 32. The carrying rails 52 and 54 lie on the guiding ledges 56 and 58 respectively, of the launcher. The construction of the launcher is, in itself, well known to a person skilled in the art and is, therefore, not described in detail here.

Figure 2:
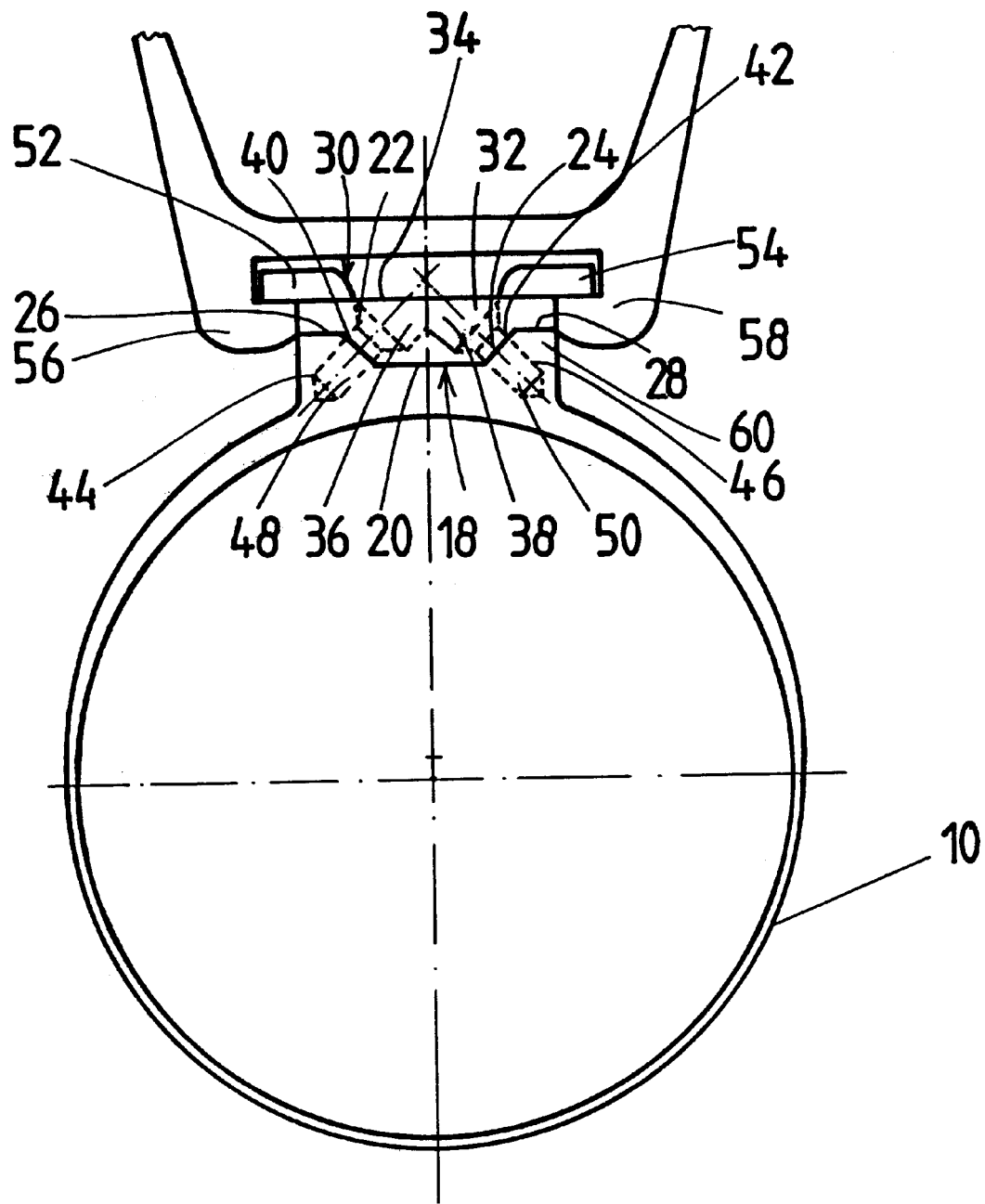
FIG. 2 shows an assembly, in which the hanger is mounted on an enlargement or increased thickness portion of the tubular airframe of the missile.

FIG. 2 is similar to FIG. 1 and corresponding parts bear the same references numerals as in FIG. 1.

The clamp 12 is omitted in FIG. 2. Instead of this, the enlargement or increased thickness portion 60 is formed on the tubular airframe of the missile 10.

Figure 3:
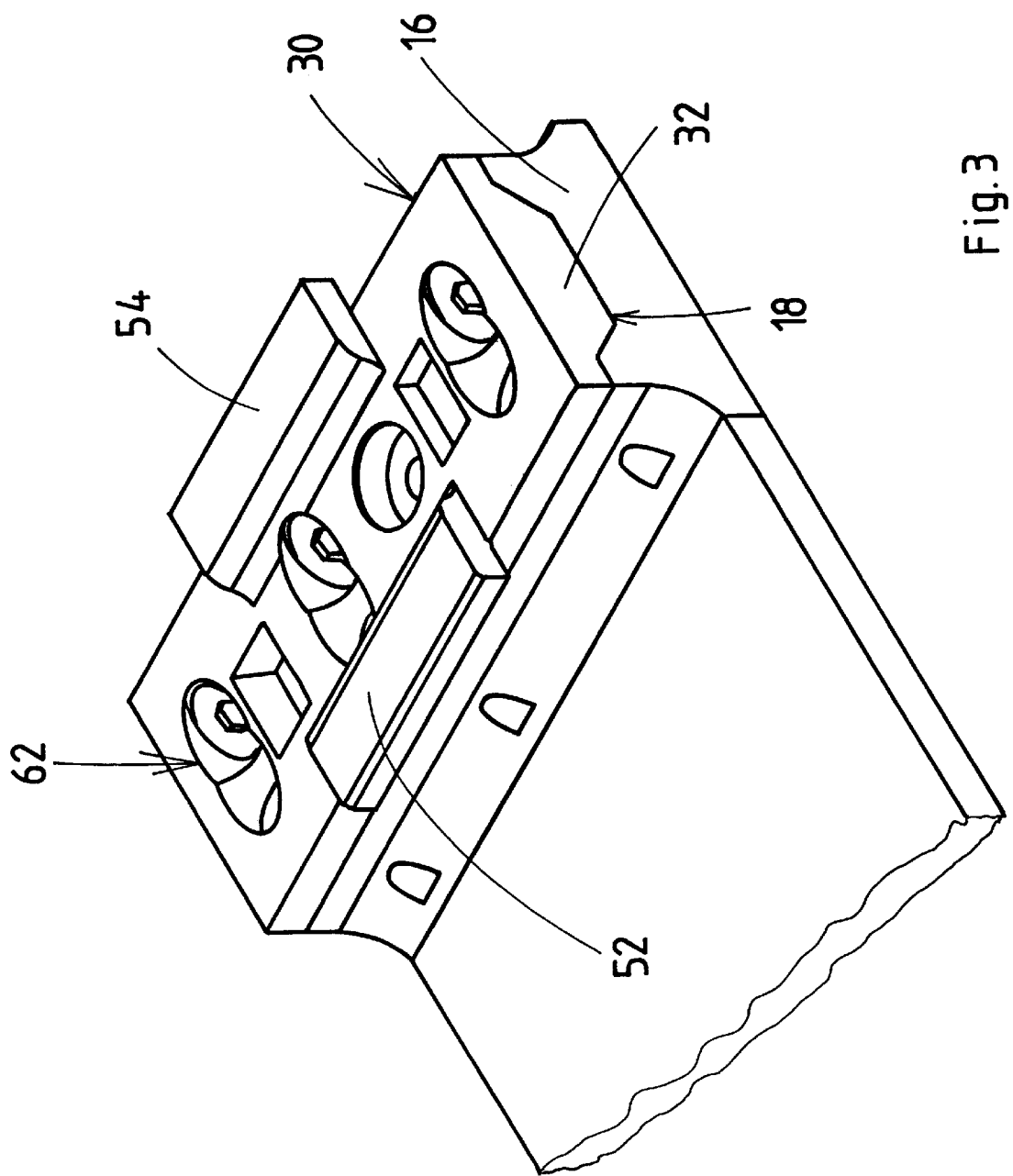
FIG. 3 is a schematic-perspective illustration of the hanger assembly.

FIG. 3 is a schematic-perspective illustration of the enlargement or increased thickness portion 16 with the hanger 30. The middle portion 32 and the enlargement or increased thickness portion 16 are longer than the carrying rails 52 and 54. The middle portion 32 and the enlargement or increased thickness portion 16 are connected with screws which are mutually axially displaced and are inclined outwards at an angle of 45° in the manner described. The use of inclined screws provides a safe threaded connection with sufficiently long threaded bores within the permitted standardised dimensions. The use of inclined locating surfaces and inclined screws produce a favourable load distribution and higher stability of the threaded connection because the screws are not subjected to bending.

The hanger assembly as described is compatible with existing systems. During the retrofitting of the missile displacement of the centre-of gravity may require the clamps to be longitudinally displaced together with the hanger.

We claim:

1. A hanger assembly for missiles comprising:

a hanger with opposed carrying rails to guide the missile into a launcher;

an increased thickness portion on the side of the missile; and screw connection means for connecting said hanger to the missile, said screw connection means comprising bolts screwed into the hanger from the outside and into the increased thickness portion;

wherein said carrying rails extend in a plane and said bolts have axes forming an angle with said plane defined by said carrying rails;

wherein said increased thickness portion defines a longitudinal channel having a trapezoidal cross-section, with inclined side surfaces;

wherein said hanger is provided with a middle portion which is matched to said longitudinal channel and has corresponding inclined side surfaces;

wherein said bolts for connecting said middle portion to the increased thickness portion extend through said inclined side surfaces of said middle portion of said hanger and of said longitudinal channel; and wherein said carrying rails extend outwards past the increased thickness portion on both sides of said middle portion.

2. A hanger assembly as claimed in claim 1, wherein said middle portion and said increased thickness portion are longer than said carrying rails, said inclined bolts being mutually axially displaced.

3. A hanger assembly for a missile, said missile having a substantially tubular airframe having a surface at least the major portion of which has the form of a cylinder, said hanger assembly comprising:

a hanger, attachable to said missile, having an inner surface facing said missile, an outer surface and bores;

longitudinal carrying rails disposed on said hanger for guiding said missile into a launcher, said carrying rails defining a plane;

an enlarged thickness portion at a side of the missile, said enlarged thickness portion projecting outwardly beyond said cylinder and extending circumferentially around part of said substantially tubular airframe, said enlarged thickness portion having threaded bores alignable with said bores in said hanger, each of said bores in said hanger and said threaded bores of said enlarged thickness portion extending outwardly in transverse planes at an acute angle with said plane defined by said carrying rails; and threaded bolts with heads and threaded ends, extendable from said outer surface of said hanger through said bores in said hanger and threadable with said threaded ends into said threaded bores in said enlarged thickness portion such that said heads engage said outer surface of said hanger.

4. The hanger assembly of claim 3, further comprising a bellyband extending around said airframe and attached thereto, said increased thickness portion being provided at said bellyband.

5. The hanger assembly of claim 4, wherein said acute angle formed by said bores with said plane defined by said carrying rails is about 45°.

* * * * *